(12) United States Patent
Kapur et al.

(10) Patent No.: US 11,951,947 B2
(45) Date of Patent: Apr. 9, 2024

(54) STAIR SYSTEM FOR VEHICLE

(71) Applicant: Opus Mach LLC, Warren, MI (US)

(72) Inventors: Deepak Kapur, Naperville, IL (US); David Bruford, Shelby Township, MI (US); Aleyna Kapur, Dearborn, MI (US); Robert Grinstead, Chisago City, MN (US); Roman Kapur, Naperville, IL (US)

(73) Assignee: Opus Mach LLC, Naperville, IL (US)

( * ) Notice: Subject to any disclaimer, the term of this patent is extended or adjusted under 35 U.S.C. 154(b) by 312 days.

(21) Appl. No.: 17/453,687

(22) Filed: Nov. 5, 2021

(65) Prior Publication Data
US 2022/0134957 A1    May 5, 2022

Related U.S. Application Data (60) Provisional application No. 63/109,921, filed on Nov. 5, 2020.

(51) Int. Cl.
*B60R 3/02* (2006.01)
*B60Q 9/00* (2006.01)

(52) U.S. Cl.
CPC ............... *B60R 3/02* (2013.01); *B60Q 9/008* (2013.01)

(58) Field of Classification Search
CPC .................................... B60R 3/02; E06C 5/02
See application file for complete search history.

(56) References Cited

U.S. PATENT DOCUMENTS

| | | | | |
|---|---|---|---|---|
| 3,796,456 A | * | 3/1974 | Bergeson | B60R 3/02 296/156 |
| 3,997,211 A | * | 12/1976 | Graves | B60R 3/02 182/116 |
| 4,347,638 A | * | 9/1982 | Weaver | B60R 3/02 182/115 |
| 4,720,116 A | * | 1/1988 | Williams | B60R 3/02 182/127 |
| 5,064,023 A | * | 11/1991 | Loeber | E06C 5/02 182/127 |
| 5,228,707 A | * | 7/1993 | Yoder | B60R 3/02 182/127 |
| 5,617,930 A | * | 4/1997 | Elia | B60R 3/02 296/62 |
| 5,887,540 A | * | 3/1999 | Krish, Jr. | B63B 27/14 114/362 |
| 6,029,775 A | * | 2/2000 | Hedley | B60R 3/02 182/127 |
| 6,058,875 A | * | 5/2000 | Krish, Jr. | E06C 5/02 114/362 |
| 6,068,277 A | * | 5/2000 | Magnussen | B60R 3/02 182/127 |

(Continued)

*Primary Examiner* — Jeffrey J Restifo
(74) *Attorney, Agent, or Firm* — Harness, Dickey & Pierce, P.L.C.

(57) ABSTRACT

A stair system that is associated with a cargo platform of a commercial vehicle for transporting goods is disclosed. The stair system is integral with the vehicle and/or the cargo platform and provides a user/operator with easy and safe access to the cargo platform without occupying the storage space provided by the cargo platform. The stair system can be arranged in a deployed configuration when in use and in a stowed configuration that is road-ready and does not prevent the vehicle from being operated on paved roads.

19 Claims, 10 Drawing Sheets

(56) References Cited

U.S. PATENT DOCUMENTS

| | | | | |
|---|---|---|---|---|
| 6,264,222 B1* | 7/2001 | Johnston | | B60R 3/02 |
| | | | | 182/127 |
| 6,401,861 B1* | 6/2002 | Marszalek | | E06C 9/08 |
| | | | | 182/86 |
| 7,025,174 B1* | 4/2006 | Hawley | | B60R 3/02 |
| | | | | 182/127 |
| 7,168,722 B1* | 1/2007 | Piotrowski | | B60R 3/02 |
| | | | | 280/166 |
| 7,469,915 B2* | 12/2008 | Horn | | B60R 3/02 |
| | | | | 182/86 |
| 8,931,792 B1* | 1/2015 | Klassen | | B60R 3/02 |
| | | | | 182/67.4 |
| 9,308,869 B1* | 4/2016 | Owens, Jr. | | E04G 1/28 |
| 9,487,148 B2* | 11/2016 | Kichline, Jr. | | B60R 3/02 |
| D937,730 S * | 12/2021 | Hamilton | | D12/203 |
| 2003/0127284 A1* | 7/2003 | Cook | | E06C 9/08 |
| | | | | 182/86 |
| 2006/0006023 A1* | 1/2006 | Lim | | B60R 3/02 |
| | | | | 182/127 |
| 2006/0261623 A1* | 11/2006 | Kuznarik | | B60R 3/02 |
| | | | | 296/62 |
| 2008/0202852 A1* | 8/2008 | Zsido | | E06C 1/381 |
| | | | | 182/129 |
| 2009/0065301 A1* | 3/2009 | Ellement | | E02F 9/0833 |
| | | | | 182/127 |
| 2010/0181741 A1* | 7/2010 | Webb | | B60R 3/02 |
| | | | | 280/166 |
| 2012/0312825 A1* | 12/2012 | Kennedy | | B60R 3/02 |
| | | | | 220/660 |
| 2013/0193667 A1* | 8/2013 | Ellement | | E02F 9/0833 |
| | | | | 280/166 |
| 2014/0239609 A1* | 8/2014 | Robertson | | B60R 3/02 |
| | | | | 280/166 |
| 2017/0158108 A1* | 6/2017 | Elbaz | | B60P 3/0255 |
| 2017/0246992 A1* | 8/2017 | Giesmann | | E06C 5/24 |
| 2018/0313151 A1* | 11/2018 | Ellement | | B60R 11/06 |
| 2019/0351832 A1* | 11/2019 | Fuller | | E06C 5/36 |
| 2022/0134957 A1* | 5/2022 | Kapur | | B60R 3/02 |
| | | | | 280/164.1 |
| 2023/0100518 A1* | 3/2023 | Denz | | B60R 3/02 |
| | | | | 182/97 |
| 2023/0114575 A1* | 4/2023 | Kapur | | B60R 3/02 |
| | | | | 280/163 |

* cited by examiner

STAIR SYSTEM FOR VEHICLE

CROSS-REFERENCE TO RELATED APPLICATIONS

This application claims the benefit of U.S. Provisional Application No. 63/109,921, filed on Nov. 5, 2020. The entire disclosure of the above application is incorporated herein by reference.

FIELD

The present disclosure relates to a stair system for a vehicle and, more particularly, to a stair system for providing access to a cargo area of a commercial vehicle.

BACKGROUND

This section provides background information related to the present disclosure and is not necessarily prior art.

Some vehicles such flatbed trucks and flatbed trailers, for example, include a cargo area for stowing cargo to be transported by the vehicle. Step ladders or other similar equipment may be necessary for accessing the cargo area. These apparatus may, themselves, need to be stowed in or on the vehicle and, therefore, may necessarily occupy storage space in the cargo area, for example, or other spaces of the vehicle. Additionally, such apparatus may be separable from the vehicle and may become misplaced or otherwise unavailable for use when needed.

SUMMARY

This section provides a general summary of the disclosure, and is not a comprehensive disclosure of its full scope or all of its features.

The present disclosure describes a stair system that is associated with a cargo platform of, e.g., a commercial vehicle for transporting goods. The stair system is integral with the vehicle and/or the cargo platform and provides a user/operator with easy and safe access to the cargo platform without occupying the storage space provided by the cargo platform. The stair system includes at least one hand rail, and preferably hand rails on both sides, to provide unfettered three points of contact capability for the user of the system. The stair system can be arranged in a deployed configuration when in use and in a stowed configuration that is road-ready and does not prevent the vehicle from being operated, e.g., on paved roads.

In one form, the present disclosure provides a stair system for providing access to a cargo platform of a commercial vehicle that is movable between a deployed configuration and a stowed configuration. The stair system can include at least one mounting bracket configured to be attached to the cargo platform of the vehicle. A stair assembly is pivotally attached to the mounting bracket at a first pivot location and can include a first support frame having a pair of opposing frame rails and a plurality of step platforms secured to the frame rails. At least one frame rail includes a side plate with an elongated slot extending along its length. The stair system also includes a handle assembly pivotally attached to the mounting bracket at a second pivot location and pivotally and slidably attached to the side plate of the frame rail. The handle assembly has at least one hand rail and a second support frame connected to the hand rail. At least one pin couples the second support frame to frame rail and is at least partially disposed in the elongated slot of the side plate of the frame rail.

When the stair system moves between the stowed configuration and the deployed configuration, the stair assembly and the handle assembly can move concurrently. When in the stowed configuration, the stair system can be positioned beneath the cargo platform of the vehicle and extend generally parallel to the cargo platform. When in the deployed configuration, the stair system can extend outwardly and downwardly from a side of the cargo platform, and an upper end of the hand rail can extend over an upper side of the cargo platform.

In another aspect of the disclosure, when the stair system moves between the stowed configuration and the deployed configuration, the pin travels along the elongated slot of the side plate of the frame rail and both the stair assembly and the handle assembly rotate about the pin.

In some configurations of the stair system, when the stair system is deployed, an uppermost step platform of the stair assembly can be vertically lower than the upper side of the cargo platform.

In still another aspect of the disclosure, the stair system can also include a motor assembly operable to drive the stair system between the stowed configuration and the deployed configuration under power. The motor assembly can include a motor, a motor shaft, a gear drive and an output shaft. The motor shaft is coupled to a drive gear of the gear drive and the drive shaft is coupled to a driven gear of the gear drive. The drive shaft is rotatably supported by the mounting bracket at the second pivot location. The drive shaft is connected to the frame rail.

In another aspect of the disclosure, the mounting bracket of the stair system can be attached to one of the underside of the cargo platform or a side rail of the cargo platform.

In still another aspect of the disclosure, the stair system can further include at least one sensor configured to detect an obstacle to movement of the stair system between the stowed configuration and the deployed configuration.

Additionally, a controller can be in communication with the motor and the sensor. The controller can interrupt operation of the motor assembly in response to the sensor detecting the obstacle. Still further, a notification system in communication with the controller and configured to generate at least one of a visual indicator and an audible indicator in response to the sensor detecting the obstacle can be provided.

In yet another form, the present disclosure provides a stair system attached to a vehicle cargo platform and movable between a deployed configuration providing access to a storage area of the cargo platform and a road-ready stowed configuration. The stair system includes a mounting bracket attached to the cargo platform, a stair assembly pivotally attached to the mounting bracket at a first pivot axis, and a handle assembly pivotally attached to the mounting bracket at a second pivot axis and pivotally and slidably attached to the stair system by a first fastener.

The stair assembly can include a first support frame having a first frame rail and a second frame rail and a plurality of step platforms secured between the first frame rail and the second frame rail. A first side plate can be attached to first frame rail and include a first elongated slot extending along a first length of the first side plate.

The handle assembly cam be pivotally attached to the mounting bracket at a second pivot axis and be pivotally and slidably attached to the first side plate of the first frame rail. The handle assembly can include a first hand rail having a first lower end and a first upper end and a first handle support frame connected to the first hand rail.

The first fastener can couple the first handle support frame to the first side plate. The first fastener can be at least partially disposed in the first elongated slot of the first side plate. When the stair system moves between the stowed configuration and the deployed configuration, the first fastener can travel along the first elongated slot of the first side plate of the first frame rail, and both the stair assembly and the handle assembly are operable to rotate about the first fastener.

In the deployed configuration, the stair system can extend outwardly and downwardly from the cargo platform, and the first upper end of the first hand rail can extend over the upper side of the cargo platform. In the stowed configuration, the stair system does not occupy the cargo storage area and remains attached to the cargo platform.

Additionally, the stair assembly can further include a second side plate attached to the second frame rail and having a second elongated slot extending along a second length of the second side plate. The handle assembly can further include a second hand rail having a second lower end and a second upper end and a second handle support frame connected to the second hand rail.

A second fastener can be provided and couple the second handle support frame to the second side plate. The second fastener can be at least partially disposed in the second elongated slot of the second side plate. When the stair system moves between the stowed configuration and the deployed configuration, the second fastener can travel along the second elongated slot of the second side plate of the second frame rail.

In the deployed configuration, the second upper end of the second hand rail can extend over the upper side of the cargo platform. In the stowed configuration, the stair system is positioned beneath the cargo platform and extends generally parallel to the underside of the cargo platform.

In still another form, the disclosure provides a commercial vehicle including a passenger cab, a cargo platform located rear of the passenger cab having an upper side, an underside, a side rail and a cargo storage area. A stair system is attached to the cargo platform and movable between a deployed configuration and a stowed configuration.

The stair system can include a pair of mounting brackets attached to one of the underside of the cargo platform and the side rail the cargo platform. A stair assembly can be pivotally attached to the mounting brackets at a first pivot axis. The stair assembly can have a first support frame comprising a first frame rail and a second frame rail, a plurality of step platforms secured between the first frame rail and the second frame rail, a first side plate attached to first frame rail and having a first elongated slot extending along a first length of the first side plate and a second side plate attached to the second frame rail and having a second elongated slot extending along a second length of the second side plate.

A handle assembly can be pivotally attached to the mounting brackets at a second pivot axis and pivotally and slidably attached to the first and second side plates of the first and second frame rails of the stair assembly. The handle assembly can include a first hand rail having a first lower end and a first upper end and a first handle support frame connected to the first hand rail and a second hand rail having a second lower end and a second upper end and a second handle support frame connected to the second hand rail.

A first fastener can couple the first handle support frame to the first side plate and be at least partially disposed in the first elongated slot of the first side plate. A second fastener can couple the second handle support frame to the second side plate and be at least partially disposed in the second elongated slot of the second side plate.

When the stair system moves between the stowed configuration and the deployed configuration, the first fastener can travel along the first elongated slot of the first side plate of the first frame rail, the second fastener can travel along the second elongated slot of the second side plate of the second frame rail, and both the stair assembly and the handle assembly are operable to rotate about the first fastener and the second fastener.

In the deployed configuration, the stair system can extends outwardly and downwardly from the side rail of the cargo platform. The first upper end of the first hand rail and the second upper end of the second hand rail can each extend over the upper side of the cargo platform. In the stowed configuration, the stair system does not occupy the cargo storage area and remains attached to the cargo platform.

Additionally, in the deployed configuration, an uppermost step platform of the plurality of step platforms of the stair assembly can be located vertically lower than the upper side of the cargo platform. Still further, in the stowed configuration, the stair system can be positioned beneath the cargo platform and extend generally parallel to the underside of the cargo platform.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With reference to the figures, a stair system is illustrated that can be integrated with a cargo platform of a vehicle, such as a commercial for transporting goods (e.g., a flatbed truck, a pick-up truck, a flatbed trailer or the like. The stair system is attached to the vehicle and/or the cargo platform and provides a user/operator with easy and safe access to the cargo platform. The stair system can be arranged in a deployed configuration when in use and in a stowed configuration that is road-ready. The stair system does not occupy the storage space provided by the cargo platform.

With initial reference to FIGS. 1-9, a stair system 110 according to the present disclosure is described. The stair system 110 can be integrated with a cargo platform 116 of a vehicle 112, such as a commercial for transporting goods (e.g., a flatbed truck, a pick-up truck, a flatbed trailer or the like. The stair system 110 can be attached to the vehicle 112 and/or the cargo platform 116 and provides a user/operator with easy and safe access to the cargo platform 116. The stair system 110 can be arranged in a deployed configuration (FIG. 5) when in use and in a stowed configuration (FIG. 6) that is road-ready. The stair system 110 does not occupy the storage space provided by the cargo platform 116.

Figure 5:
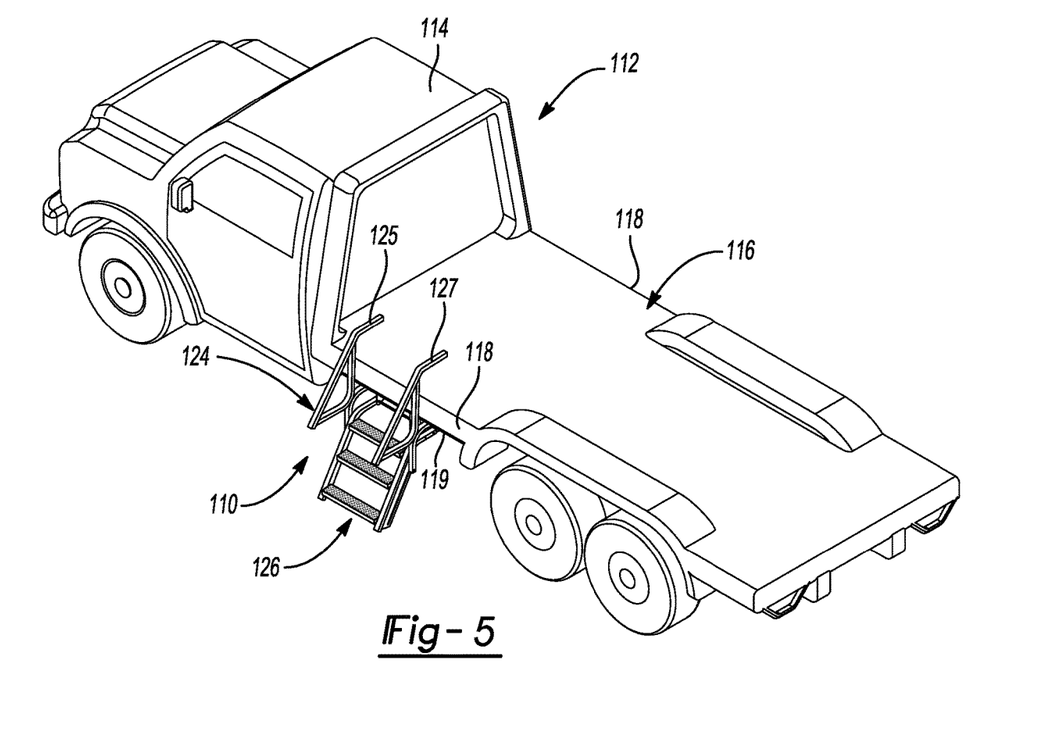
FIG. 5 is a perspective view of a flatbed truck incorporating a stair system according to FIG. 1 of the present disclosure and showing the stair system in a deployed configuration.
Figure 6:
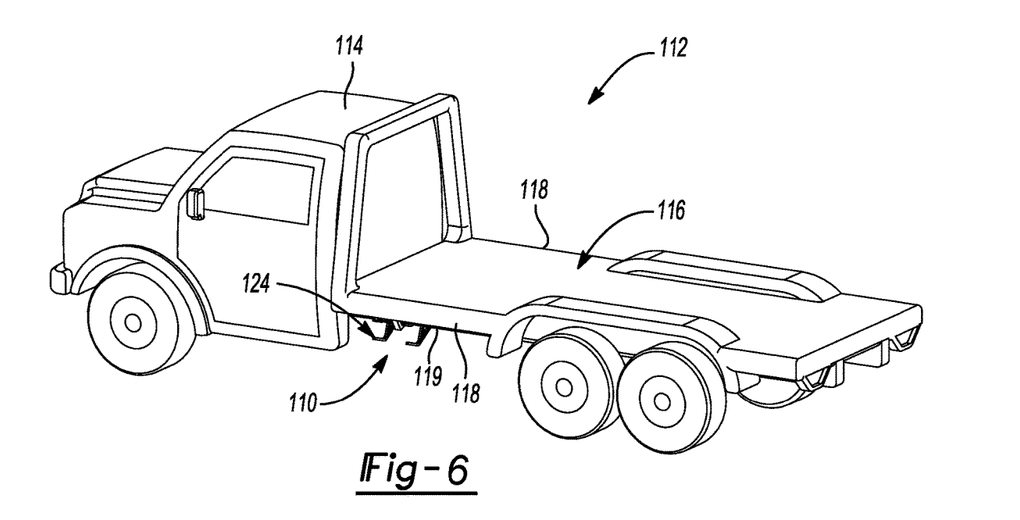
FIG. 6 is a perspective view of a flatbed truck and incorporating a stair system according to the principles of the present disclosure and showing the stair system in a stowed configuration.

As illustrated in FIGS. 5 and 6, the cargo platform 116 may be located rear of a cab 114 of the vehicle 112. The cargo platform can have side rails or sides 118 extending along a length of the cargo platform 116 between forward and read ends of the cargo platform 116. The stair system 110 may be attached to an underside or lower surface 119 of the cargo platform 116 and/or at one of the side rails or sides 118.

With referenced to FIGS. 1-4, the stair system 110 may include one or more mounting brackets 122, a handle assembly 124, a stair assembly 126 and (optionally) a motor assembly 129.

The mounting brackets 122 may be J-shaped channel and may be made of a metal material. The mounting brackets 122 may be spaced apart from each other and fixedly mounted to the underside 119 of the cargo platform 116 and/or to a side rail 118 of the cargo platform 116. Each mounting bracket 122 may include a first wall 128, a second wall 130 and a third wall 132 that cooperate to form a cavity 134. Each first wall 128 of the mounting brackets 122 may define the outer lateral boundaries of the stair system 110. The first and second walls 128, 130 may extend parallel to each other and perpendicular to the third wall 132. The handle assembly 124 may be pivotally coupled to the first walls 128 of the mounting brackets 122 at pivot locations 121. The stair assembly 126 may be pivotally coupled to the second walls 130 of the mounting brackets 122 at pivot locations 123. In some configurations, the second wall 130 may also be coupled to the motor assembly 129. The third wall 132 may be fixedly mounted (e.g., welded) to the cargo platform 116. In some configurations, fasteners (not shown) may extend through apertures (not shown) in the third wall 132 to fixedly mount the mounting brackets 122 to the lower surface 119 of the cargo platform 116 and/or to the side rail 118. Alternatively, the mounting brackets 122 can be attached to the lower surface 119 of the cargo platform 116 and/or to the side rail 118, e.g., by welding.

The handle assembly 124 includes first and second handles 125, 127. Each handle 125, 127 may be made of a metal material. In some configurations, each handle 125, 127 may be made of a polymer or composite material, for example. Each handle 125, 127 may include a first connecting bar 138, a second connecting bar 140 and a hand rail 142.

With continued reference to FIGS. 1-4, the first connecting bar 138 can be V or U shaped and can include a first arm 144, a second arm 146 and an arcuate middle portion 149. An inner end of the first arm 144 extends from a first end of the middle portion 149 and an outer end of the first arm 144 is coupled (e.g., connected or fixed) to the gripping bar 142. An inner end of the second arm 146 extends from a second end of the middle portion 149 and an outer end of the second arm 146 is coupled to the gripping bar 142.

The second connecting bar 140 can be V or U shaped and can include a first arm 158, a second arm 160 and an arcuate middle portion 162. An inner end of the first arm 158 extends from a first end of the middle portion 162 and an outer end of the first arm 158 is coupled to the stair assembly 126 by the pin 183. An inner end of the second arm 160 extends from a second end of the middle portion 162 and an outer end of the second arm 160 is received in a cavity 134 of a respective mounting bracket 122. The second arm 160 is rotatably or pivotally coupled to the first wall 128 of a respective mounting bracket 122, e.g., via a pivot pin, at the pivot location 121. The middle portion 162 of the second connecting bar 140 is fixed (e.g., via threaded fasteners, welding or any other suitable method) to the middle portion 149 of the first connecting bar 138.

The hand rail 142 may be rectangular-shaped and hollow to reduce the weight of the stair system 110. In some configurations, however, the hand rail 142 may be solid and cylindrically-shaped, for example. The hand rail 142 may be attached (e.g., fastened or welded) to the first connecting bar 138 and may include an inclined portion 172 and a horizontal portion 174. The inclined portion 172 may extend at an angle relative to the horizontal portion 174 and may be attached to the first connecting bar 138 at different locations. That is, a lower end 176 of the inclined portion 172 may be attached to the outer end of the second arm 146 of the first connecting bar 138, and an upper end 178 of the inclined portion 172 may be attached to the outer end of the first arm 138 of the first connecting bar 138. The horizontal portion 174 of the hand rail 142 extends horizontally and at least partially over the cargo platform 116 when the stair system 110 is in the deployed configuration. In this way, a user/operator of the stair system 110 can step from the stair assembly 126 directly onto the cargo platform 116, and can conveniently and naturally grasp the horizontally extended horizontal portion 174 of the hand rail 142 for support and stability. The horizontal portion 174 of the hand rail 142 is located at least partially beneath the cargo platform 116 and/or the side rail 118 when the stair system 110 is in the stowed configuration.

The stair assembly 126 may be made of a metal material and may include a plurality of step platforms 150 and two opposing rail mechanisms 148, each located at an opposite lateral side of the step platforms 150. Each rail mechanism 148 is pivotally attached to a respective mounting bracket 122 at the pivot location 123 and includes a rail 154, a connecting member 157 and an rail plate 156. The rail 154 may be rectangular-shaped and hollow to reduce the weight of the stair system 110. In some configurations, the rail 154 may be solid and cylindrically-shaped, for example. The rail 154 may be attached (e.g., welded) to the rail plate 156. A first end of the connecting member 157 may be attached (e.g., welded) to the rail 154 and a second end of the connecting member 157 may be pivotally attached to the second wall 130 of the respective mounting bracket 122 at the pivot location 123. The rail plate 156 may include an elongated slot 170 formed therein. The slot 170 may be at a lower portion of the rail plate 156 and may extend between opposing ends of the rail plate 156. A pin 183 may extend through the first arm 158 and into the slot 170 to thereby couple the handle assembly 124 to the stair assembly 126.

The step platforms 150 may be attached (e.g., welded) to and extend between the rails 154. The step platforms 150 may be offset from one another such that a user/operator may conveniently traverse the step platforms 150 when ascending and/or descending the stair assembly 126.

Figure 1:
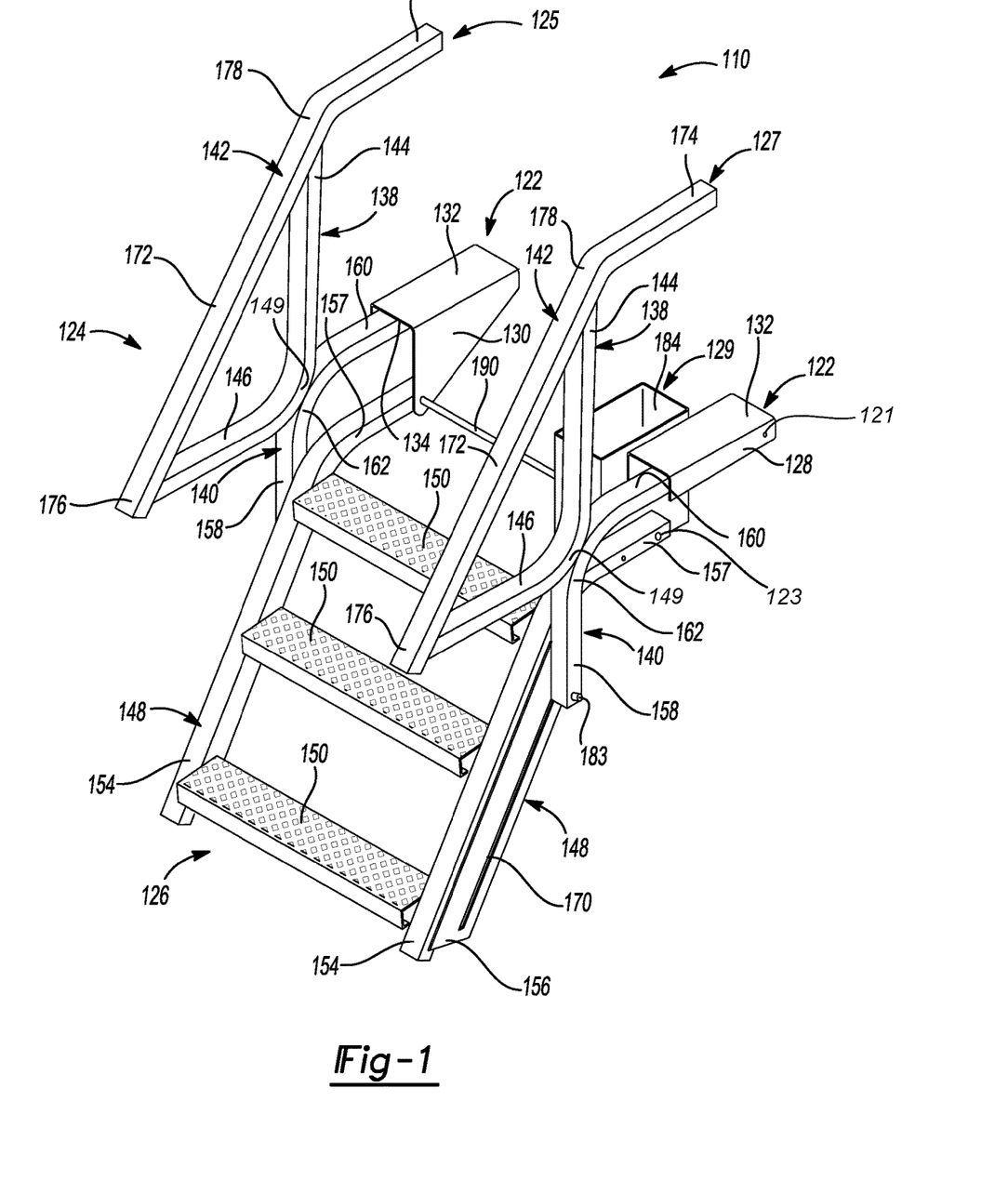
FIG. 1 is a front-right perspective view of the stair system according to the present disclosure.
Figure 2:
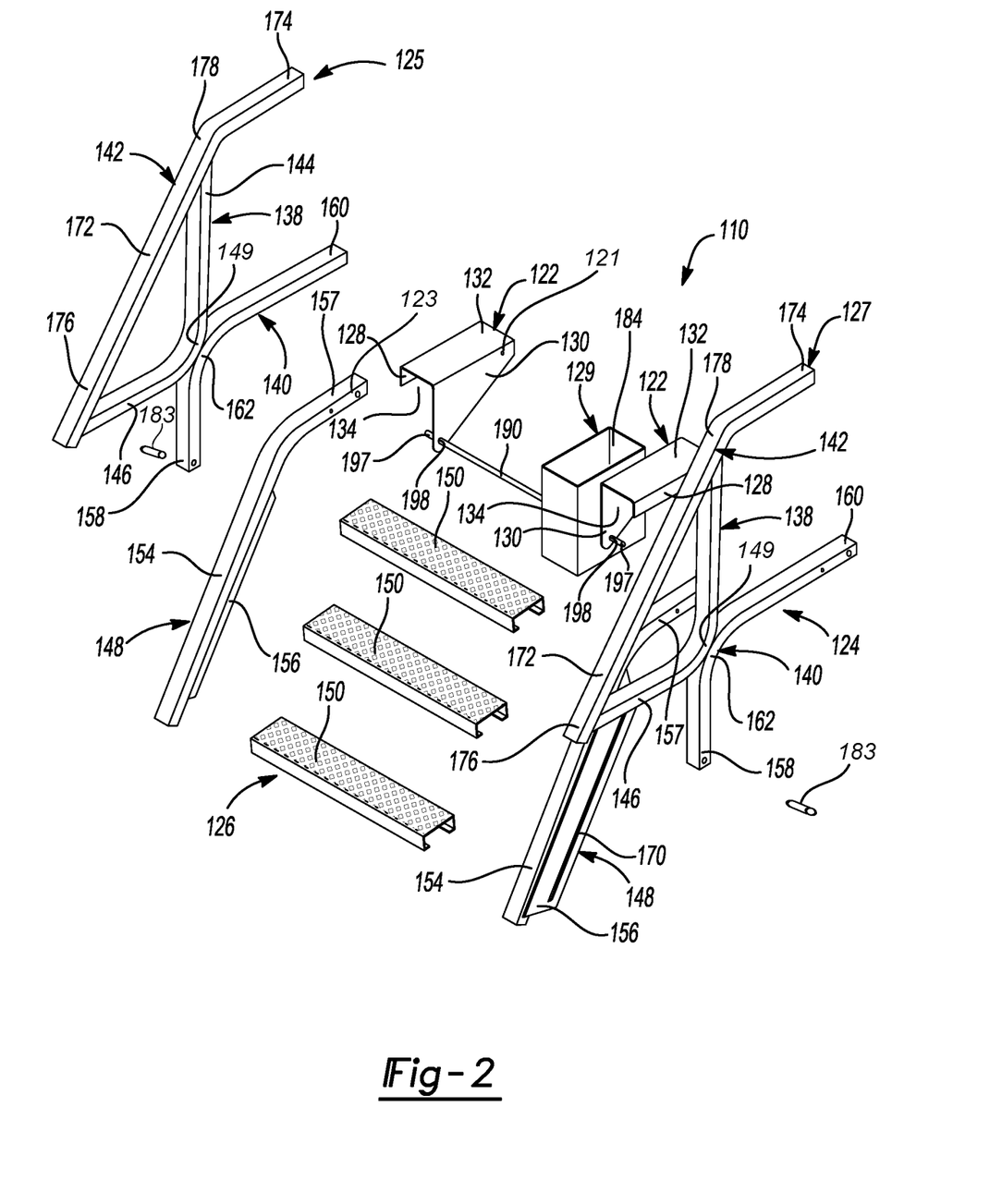
FIG. 2 is an exploded perspective view of the stair system shown in FIG. 1.
Figure 3:
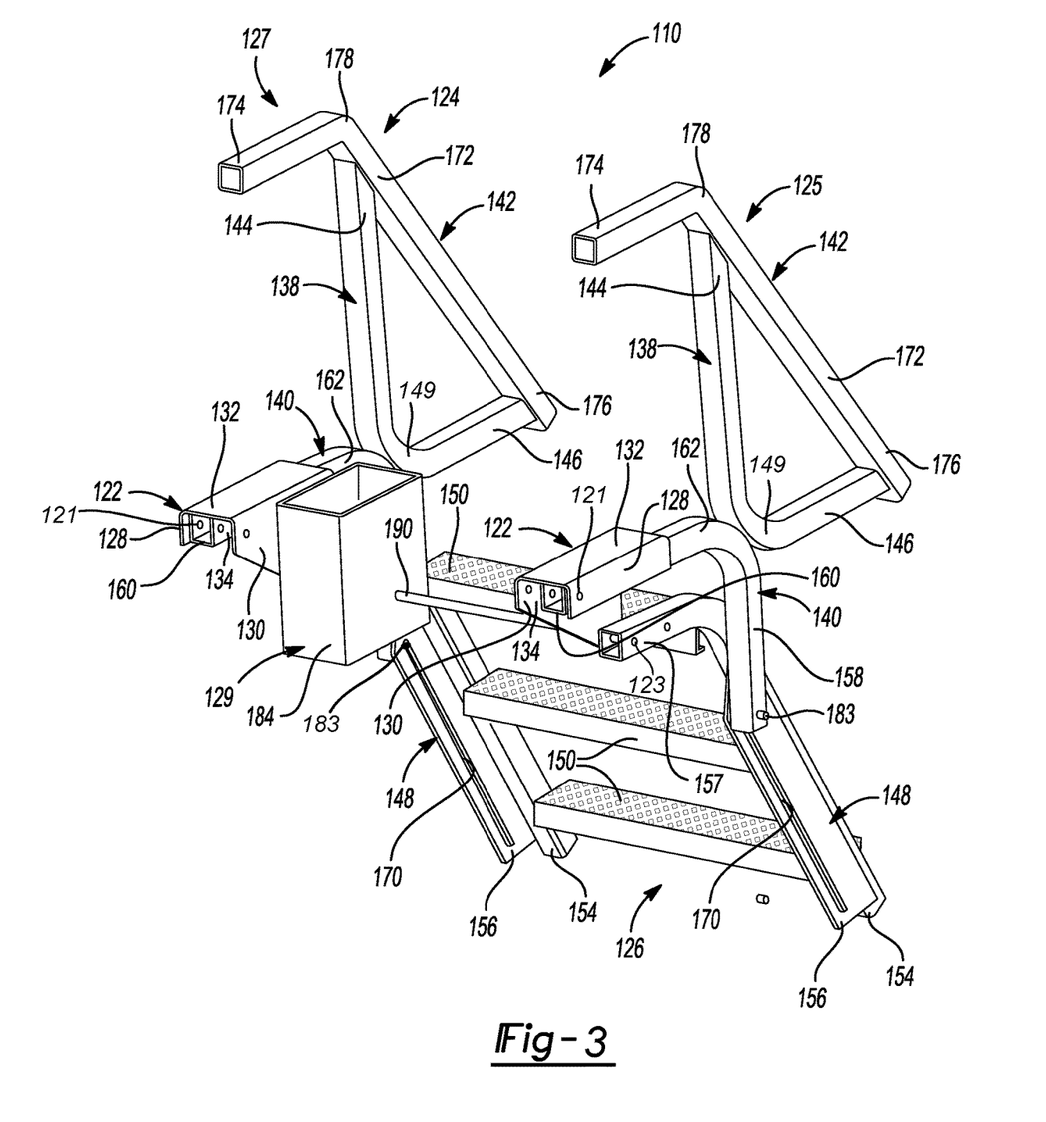
FIG. 3 is back-left perspective view of the stair system shown in FIG. 1.
Figure 4:
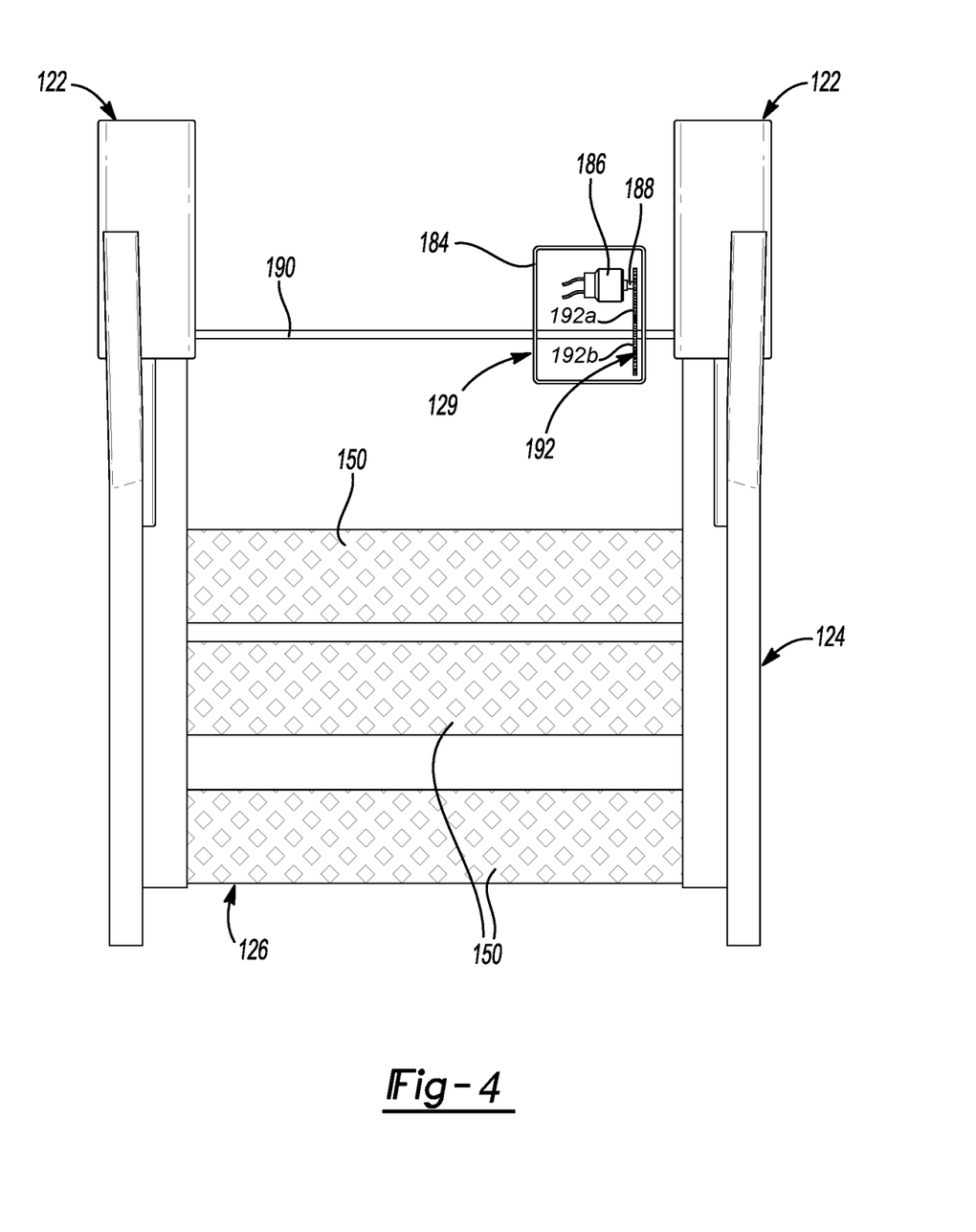
FIG. 4 is a top view of the stair system shown in FIG. 3.
Figure 7:
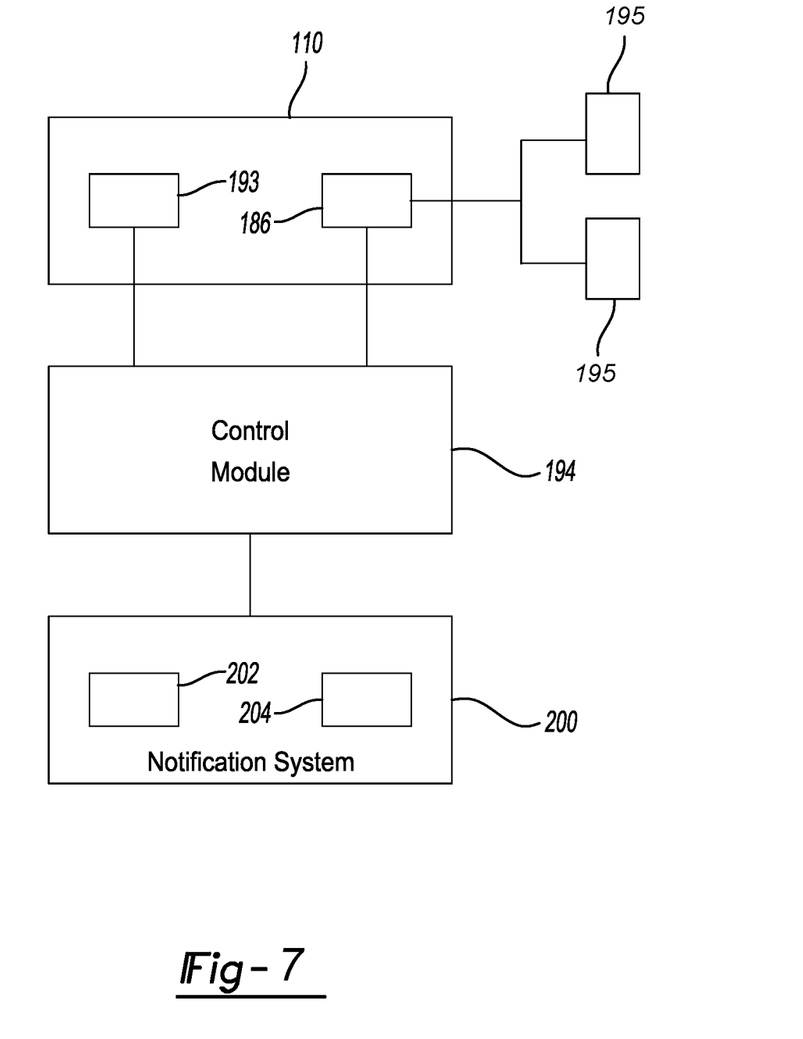
FIG. 7 is a schematic block diagram illustrating communication between a control module, a notification system and the stair system of the present disclosure.

The stair system 110 can optionally include a motor assembly 129 for powering movement of the stair system 110 between the stowed and deployed configurations. The motor assembly 129 may be operatively coupled to the stair assembly 126 to drive (e.g., rotate) the stair assembly 126 between deployed and stowed conditions, which correspondingly drives the handle assembly 124 between deployed and stowed conditions. With particular reference to FIGS. 1, 4 and 7, the motor assembly 129 can include a motor housing 184, a motor 186, a rotatable motor shaft 188 (FIG. 4; e.g., a drive shaft) driven directly by the motor, a gear drive mechanism 192 (FIG. 4, e.g., a torque amplifying gear set comprising a drive gear or pinion gear 192a and a driven gear or reduction gear 192b) operatively coupled to the motor shaft 188, a rotatable output shaft 190 (FIG. 4) operatively coupled to and driven by the driven gear 192b of the gear drive mechanism 192, one or more sensors 193 (FIG. 7) and a controller 194 (FIG. 7). The motor housing 184 may house the motor 186, the motor shaft 188, the gear drive mechanism 192, and may partially house the output shaft 190. The output shaft 190 is rotatably supported (e.g., journaled) by the mounting brackets 122 and the motor housing 184. In some configurations, the motor housing 184 may be coupled to one of the mounting brackets 122.

The motor shaft 188 may be operatively connected to the motor 186 and the pinion gear 192a of the gear mechanism 192 such that operation of the motor 186 causes the motor shaft 188 to rotatably drive the gear mechanism 192. The drive gear 192b of the gear mechanism 192 rotatably drives the output shaft 190. Opposing ends 197 (FIG. 2) of the drive shaft 190 are connected to the stair assembly 126 at second pivot locations 123. Thus, rotation of the output shaft 190 rotates the stair assembly 126 about the pivot locations 123. That is, opposing ends 197 of the drive shaft 190 extend through apertures 198 of respective mounting brackets 122 and fixedly engage respective connecting members 157 of the stair assembly 124. In this way, rotation of the drive shaft 190 rotates the stair assembly 126 between the stowed configuration and the deployed configuration, which in turn rotates the handle assembly 124 (via pins 183) between the stowed configuration and the deployed configuration.

The sensors 193 (e.g., infrared (IR) sensors, microwave sensors or any other suitable sensors) are in communication with the controller 194 and may be attached at various locations on the stair system 110. For example, the sensors 193 can be attached to one or more of the mounting brackets 122, the stair assembly 126, the handle assembly 124 and/or the motor housing 184. The sensors 193 may be proximity sensors and configured to detect objects (e.g., a pole, a curb, a building, etc.) that are in the path of the stair system 110 as the stair system 110 moves between the stowed and deployed configurations. In this way, if the sensors 193 detect an object in the path of the stair system 110, the sensors 193 may send a signal to the controller 194.

The controller 194 may be operable to supply and/or interrupt power to the motor 186 in response to input signal from the sensors 193 to thereby control movement of the stair system 110 between the deployed and stowed configurations. For example, the controller 194 may interrupt power to the motor 186 and prevent continued movement of the stair system 110 between the deployed and stowed configurations if the controller 194 receives a signal from the sensors 193 indicating an object has been detected in the path of movement of the stair system 110. Upon removing the object from the path of movement, the controller 194 can restore power to the motor 186 and allow movement of the stair system 110 to continue.

The motor 186 may be electrically coupled to a first actuator 191 (e.g., a toggle, a switch, a button, or the like) accessible by a user/operator (e.g., disposed inside the cab 114). A second actuator 195 may also be included and disposed outside the cab 114 (e.g., near a location of the stair system 110), instead of, or in addition to, the first actuator 191 located inside the cab 114. For example, the actuators 191, 195 may, for example, be 3-position toggle switches. In a first position, the actuators 191, 195 may enable operation of the motor 186 to deploy the stair system 110 (e.g., powering the motor 186 ON to drive the motor shaft 188 in a clockwise direction), in a second position the actuators 191, 195 may enable operation of the motor 186 to stow the stair system 110 (e.g., powering the motor 186 ON to drive the motor shaft 188 in a counter-clockwise direction), and in a third position the actuators 191, 195 may disable operation of the motor 186 (e.g., to power the motor 186 OFF).

The notification system 200 could be a computer, a mobile phone (e.g., smartphone), or a tablet, for example, or any other communication device or network of devices. The controller 194 may be in communication with the notification system 200 via, for example, an internet, Wi-Fi, Bluetooth®, Zigbee®, power-line carrier communication (PLCC), or cellular connection or any other wired or wireless communication protocol. The notification system 200 may enable the user/operator to interact with and/or receive communications from the controller 194. For example, the notification system 200 may provide notifications to the user/operator regarding the status of the stair system 110 (e.g., whether it is deployed, stowed or if an object has prevented the stair system 110 from being fully deployed or fully stowed). The notification system 200 may include a visual indicator 202 (e.g., flashing red lights) and/or an audio indicator 204 (e.g., audible alarm) that may conveniently notify the user of communications from the notification system 200 (e.g., that power to the motor 186 has been interrupted because an object is in the path of movement of the stair system 110.

Deploying and stowing the stair system 10 can be understood with reference to FIGS. 1, 5, 6, 8 and 9. FIGS. 5 and 6 show a flatbed truck 112 having a cargo platform 116 and incorporating a stair system 110 according to the present disclosure. In FIG. 5 the stair system 110 is in a deployed configuration and enabling easy and safe access to the cargo platform 116. In FIG. 6 the stair system 110 is in a stowed configuration allowing the vehicle 112 to be "road-ready."

As seen in FIGS. 1 and 5, when the stair system 110 is in the deployed configuration, the stair assembly 126 may extend downwardly and away from the cargo platform 116 toward a ground surface. The handle assembly 124 may be positioned above the stair assembly 126 adjacent to the lateral sides of the stair assembly 126 and may extend over the cargo platform 116 of the vehicle 112. When the stair system 110 is in the stowed configuration, the stair assembly 126 may extend generally parallel to the cargo platform 116 and may be positioned adjacent to the underside 119 of the cargo platform 116. In the stowed configuration, the stair system 110 preferably does not extend outboard of the side rail 118 and is sufficiently near the underside 119 of the cargo platform 116 to provide adequate ground clearance for the truck 112 to travel on the road.

Figure 8:
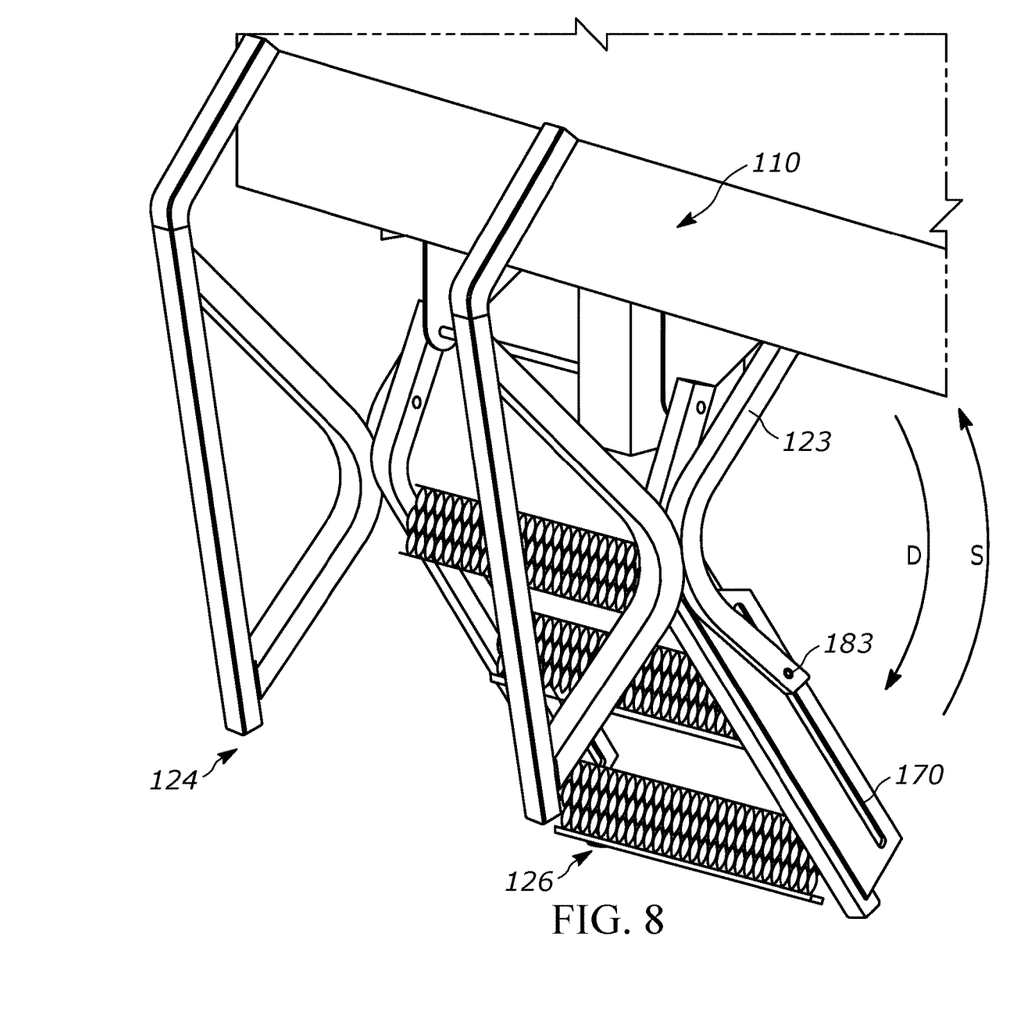
FIGS. 8 and 9 are front-right perspective views of the stair system shown in FIG. 1 moving between the deployed and stowed configurations.
Figure 9:
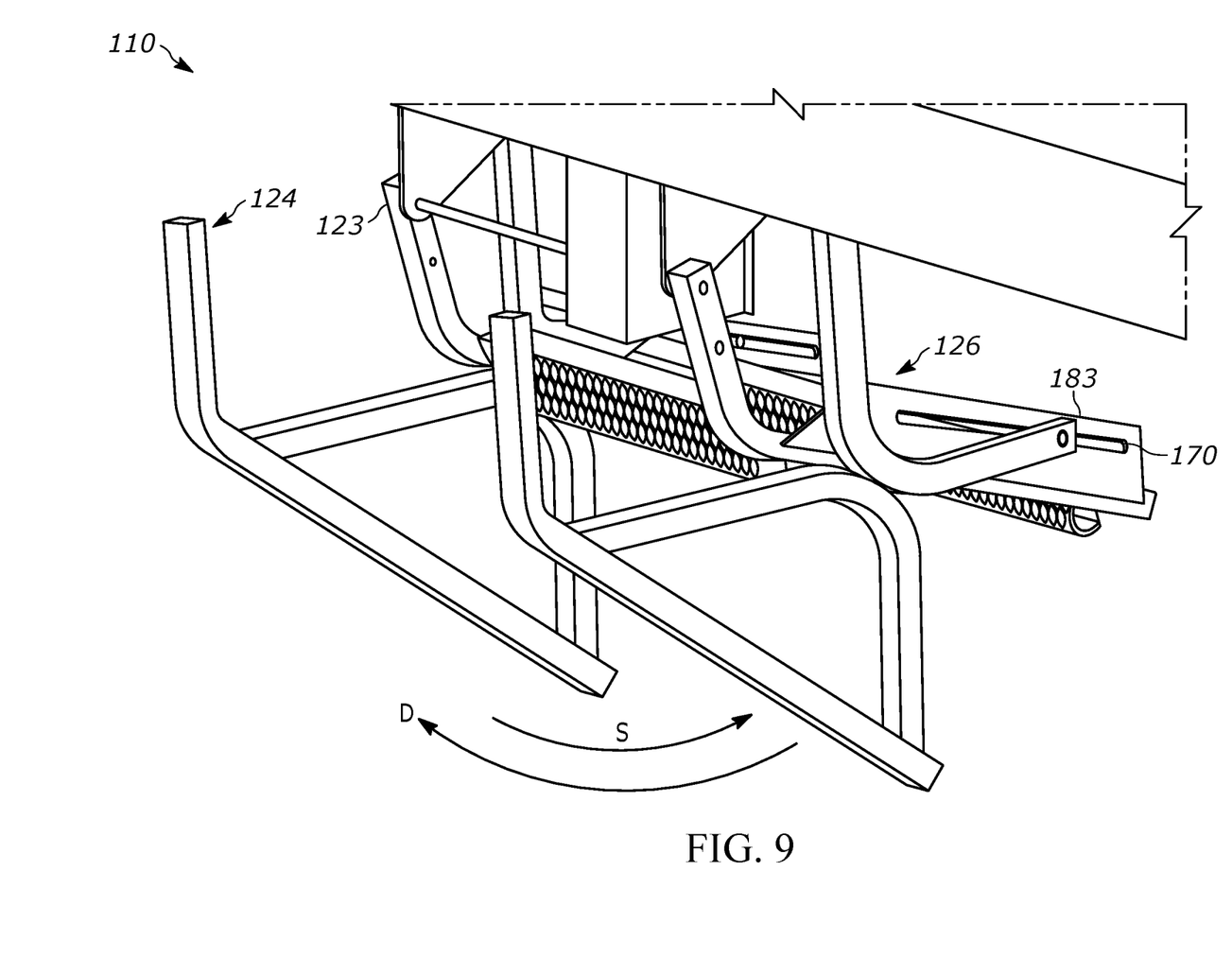
Figure 10:
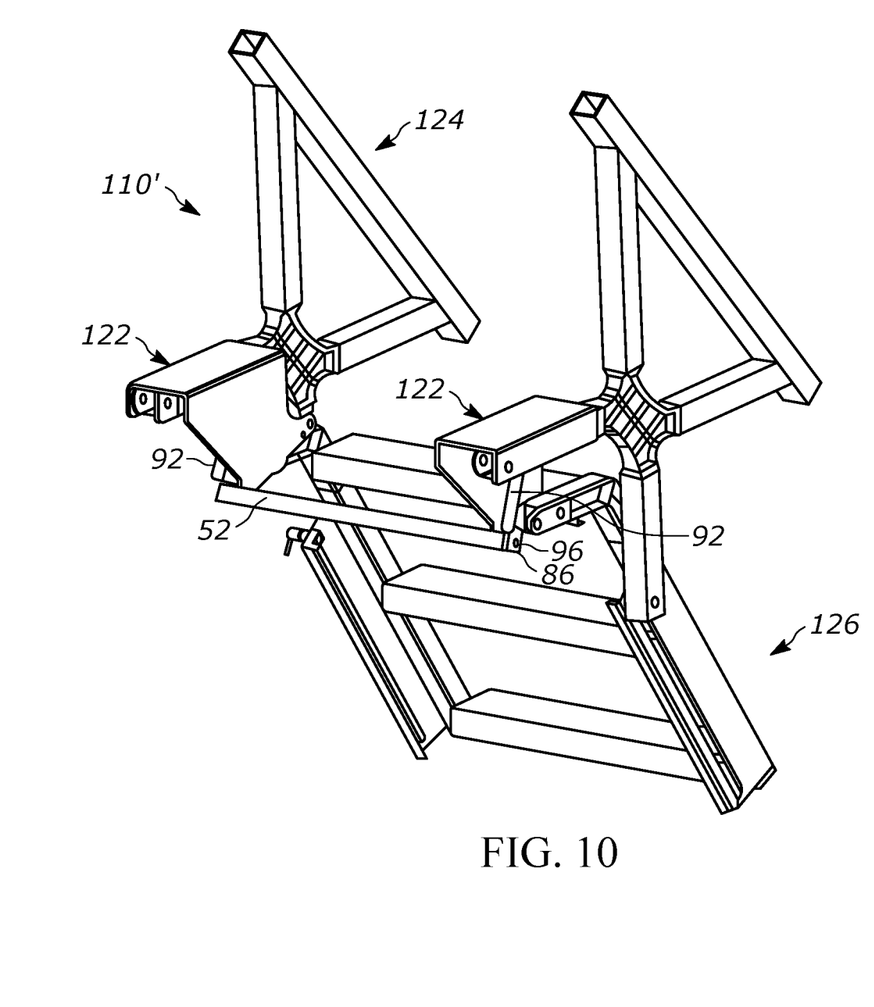
FIG. 10 is a back-left perspective view of another stair system according to the principles of the present disclosure.
Figure 11:
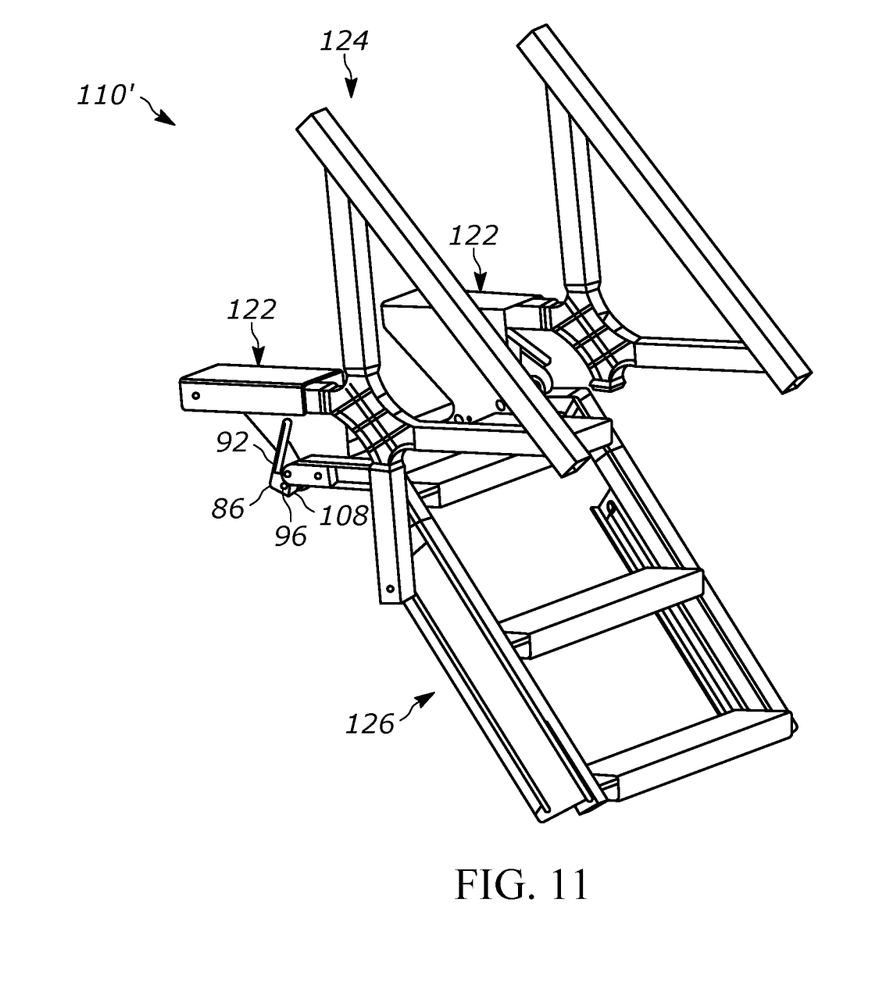
FIG. 11 is a front-left perspective view of the stair system of FIG. 10.

Stowing and deploying the stair system 110 can be understood with reference to FIGS. 8 and 9. Movement of the stair system 110 between the stowed configuration (see arrow S) and deployed configuration (see arrow D) can be initiated by the user/operator and may be accomplished under power or manually. Under powered operation of the stair system 110, the motor 186 rotates the drive shaft 190 (via the motor shaft 188 and gear mechanism 192) so as to rotate or pivot the stair assembly 126 about the pivot locations 123. As the stair assembly 126 rotates, the pins 183 connecting the handle assembly 124 to the stair assembly 126 translate in the slot 170 of the rail plate 156 and cause the handle assembly 124 to correspondingly move with the stair assembly 126 and rotate or pivot about the pivot locations 121. Depending on the direction of rotation of the second shaft 190, the stair system 110 is driven to either the deployed configuration or the stowed configuration. In either case, the stair assembly 126 and the handle assembly 124 of the stair system 110 move concurrently, Optionally, the stair system 110' may not include a motor. Rather, the stair system 110' may be manually operated (i.e., moved between the stowed and deployed configurations) by the user/operator. As shown in FIGS. 10 and 11, the stair assembly 126 may incorporate a connecting bar 52 extending between the mounting plates 122. The connecting bar 52 may include flanges 86 extending from its opposite ends. A pin 96 may extend through a respective flange 86, a respective mounting plate 122 and a respective actuation lever 92, thereby pivotally coupling the connecting bar 52 and the actuation levers 92 to the mounting plates 122.

Each actuation lever 92 may be disposed between a respective flange 86 and a respective mounting plate 122. A biasing member 108, such as a torsion spring, may be disposed on each actuation lever 92 and may bias the actuation lever 92 into a locked position. When the actuation lever 92 is in the locked position, the handle assembly 124 and the stair assembly 126 are prevented from being rotated between the stowed and deployed positions. A user/operator may engage the actuation lever 92 to overcome the bias, thereby moving the actuation lever 92 into an unlocked positon. Once unlocked, the handle assembly 124 and stair assembly 126 are free to rotate.

Each actuation lever 92 may be coupled to the connecting bar 52 such that when one of the actuation levers 92 is moved into an unlocked position, the connecting bar 52 rotates and causes the other actuation lever 92 to likewise move into an unlocked position. As such, only one of the actuation levers 92 needs to be engaged by the user/operator in order to operate the stair system 110'.

The stair system 110, 110' of the present disclosure provides a convenient way to access the cargo platform 116 of a vehicle 112. The stair system 110, 110' can include a plurality of hand rails to provide three points of contact for the user of the system. The stair system 110, 110' may be stored when not in use deployed when in use without using additional storage space on the cargo platform 116 of the vehicle 112. It should be understood that the stair system 110, 110' may also be employed in vehicles such as in trailers, for example. It should also be understood that a plurality of stair systems 110, 110' may also be employed to provide access to a cargo platform 116 from multiple locations around the vehicle 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stair system for providing access to a cargo platform of a commercial vehicle, the stair system movable between a deployed configuration and a stowed configuration, the stair system comprising:

at least one mounting bracket configured to be attached to the cargo platform of the vehicle;

a stair assembly pivotally attached to the at least one mounting bracket at a first pivot location, the stair assembly comprising a first support frame comprising a pair of opposing frame rails and a plurality of step platforms secured to the frame rails of the first support frame, wherein at least one frame rail comprises a side plate comprising an elongated slot extending along a length of the side plate; and a handle assembly pivotally attached to the at least one mounting bracket at a second pivot location and pivotally and slidably attached to the side plate of the at least one frame rail of the stair assembly, the handle assembly comprising at least one hand rail having a lower end and an upper end, and at least one second support frame connected to the at least one hand rail; and at least one pin coupling the at least one second support frame to the at least one frame rail of the stair assembly, the at least one pin at least partially disposed in the elongated slot of the side plate of the at least one frame rail;

wherein, when stair system moves between the stowed configuration and the deployed configuration, the stair assembly and the handle assembly move concurrently;

wherein, when in the stowed configuration, the stair system is configured to be positioned beneath the cargo platform and to extend generally parallel to the cargo platform; and wherein, when in the deployed configuration, the stair system is configured to extend outwardly and downwardly from a side of the cargo platform, and the upper end of the at least one hand rail is configured to extend over an upper side of the cargo platform.

2. The stair system of claim 1, wherein, when the stair system is in the deployed configuration, an uppermost step platform of the plurality of step platforms of the stair assembly is configured to be located vertically lower than an upper side of the cargo platform.

3. The stair system of claim 1, wherein, when the stair system moves between the stowed configuration and the deployed configuration, the pin is operable to travel along the elongated slot of the side plate of the at least one frame rail and both the stair assembly and the handle assembly are operable to rotate about the pin.

4. The stair system of claim 3, further comprising a motor assembly operable to drive the stair system between the stowed configuration and the deployed configuration under power, the motor assembly comprising a motor, a motor shaft, a gear drive and an output shaft;
 wherein the motor shaft is coupled to a drive gear of the gear drive and the output shaft is coupled to a driven gear of the gear drive; and
 wherein the output shaft is rotatably supported by the at least one mounting bracket at the second pivot location; and
 wherein the output shaft is connected to the at least one frame rail.

5. The stair system of claim 4, further comprising at least one sensor configured to detect an obstacle to movement of the stair system between the stowed configuration and the deployed configuration.

6. The stair system of claim 5, further comprising a controller in communication with the motor and the at least one sensor; and
 wherein the controller interrupts operation of the motor assembly in response to the at least one sensor detecting the obstacle to movement of the stair system between the stowed configuration and the deployed configuration.

7. The stair system of claim 6, further comprising a notification system in communication with the controller and configured to generate at least one of a visual indicator and an audible indicator in response to the at least one sensor detecting the obstacle to movement of the stair system between the stowed configuration and the deployed configuration.

8. A commercial vehicle comprising the stair system of claim 7, wherein the at least one mounting bracket of the stair system is attached to at least one of an underside of the cargo platform of the vehicle or a side rail of the cargo platform of the vehicle.

9. The stair system of claim 1, further comprising a motor assembly operable to drive the stair system between the stowed configuration and the deployed configuration under power, the motor assembly comprising a motor, a motor shaft, a gear drive and an output shaft;
 wherein the motor shaft is coupled to a drive gear of the gear drive and the output shaft is coupled to a driven gear of the gear drive; and
 wherein the output shaft is rotatably supported by the at least one mounting bracket at the second pivot location; and
 wherein the output shaft is connected to the at least one frame rail.

10. A commercial vehicle comprising the stair system of claim 9, wherein the at least one mounting bracket of the stair system is attached to an underside of the cargo platform of the vehicle.

11. A commercial vehicle comprising the stair system of claim 9, wherein the at least one mounting bracket of the stair system is attached to side rail of the cargo platform of the vehicle.

12. A stair system attached to a vehicle cargo platform and movable between a deployed configuration providing access to a storage area of the cargo platform and a road-ready stowed configuration, the stair system comprising:
 a mounting bracket attached to the cargo platform;
 a stair assembly pivotally attached to the mounting bracket at a first pivot axis, the stair assembly comprising a first support frame comprising a first frame rail and a second frame rail, a plurality of step platforms secured between the first frame rail and the second frame rail, a first side plate attached to first frame rail and comprising a first elongated slot extending along a first length of the first side plate;
 a handle assembly pivotally attached to the mounting bracket at a second pivot axis and pivotally and slidably attached to the first side plate of the first frame rail, the handle assembly comprising a first hand rail having a first lower end and a first upper end and a first handle support frame connected to the first hand rail;
 a first fastener coupling the first handle support frame to the first side plate, the first fastener at least partially disposed in the first elongated slot of the first side plate;
 wherein, when the stair system moves between the stowed configuration and the deployed configuration, the first fastener is operable to travel along the first elongated slot of the first side plate of the first frame rail, and both the stair assembly and the handle assembly are operable to rotate about the first fastener;
 wherein, in the deployed configuration, the stair system extends outwardly and downwardly from the cargo platform, and the first upper end of the first hand rail extends over an upper side of the cargo platform; and
 wherein, in the stowed configuration, the stair system does not occupy the cargo storage area and remains attached to the cargo platform.

13. The stair system of claim 12, wherein the stair assembly further comprises a second side plate attached to the second frame rail and comprising a second elongated slot extending along a second length of the second side plate; and
 the handle assembly further comprises a second hand rail having a second lower end and a second upper end and a second handle support frame connected to the second hand rail;
 the stair system further comprising a second fastener coupling the second handle support frame to the second side plate, the second fastener at least partially disposed in the second elongated slot of the second side plate;
 wherein, when the stair system moves between the stowed configuration and the deployed configuration, the second fastener is operable to travel along the second elongated slot of the second side plate of the second frame rail;
 wherein, in the deployed configuration, the second upper end of the second hand rail each extends over an upper side of the cargo platform; and
 wherein, in the stowed configuration, the stair system is positioned beneath the cargo platform and extends generally parallel to an underside of the cargo platform.

14. The stair system of claim 13, further comprising a motor assembly operable to drive the stair system between the stowed configuration and the deployed configuration under power, the motor assembly comprising a motor, a motor shaft, a gear drive and an output shaft;

wherein the motor shaft is coupled to a drive gear of the gear drive and the output shaft is coupled to a driven gear of the gear drive; and wherein the output shaft is rotatably supported by the mounting bracket at the second pivot axis; and wherein the output shaft is connected to the first frame rail and the second frame rail.

15. The stair system of claim 14, further comprising at least one sensor configured to detect an obstacle to movement of the stair system between the stowed configuration and the deployed configuration.

16. The stair system of claim 15, further comprising a controller in communication with the motor and the at least one sensor; and wherein the controller interrupts operation of the motor assembly in response to the at least one sensor detecting the obstacle to movement of the stair system between the stowed configuration and the deployed configuration.

17. The stair system of claim 16, further comprising a notification system in communication with the controller and configured to generate at least one of a visual indicator and an audible indicator in response to the at least one sensor detecting the obstacle to movement of the stair system between the stowed configuration and the deployed configuration.

18. A commercial vehicle comprising:

a passenger cab;

a cargo platform located rear of the passenger cab comprising an upper side, an underside, a side rail and a cargo storage area;

a stair system attached to the cargo platform and movable between a deployed configuration and a stowed configuration, the stair system comprising:

a pair of mounting brackets attached to one of the underside of the cargo platform and the side rail the cargo platform;

a stair assembly pivotally attached to the mounting brackets at a first pivot axis, the stair assembly comprising a first support frame comprising a first frame rail and a second frame rail, a plurality of step platforms secured between the first frame rail and the second frame rail, a first side plate attached to first frame rail and comprising a first elongated slot extending along a first length of the first side plate and a second side plate attached to the second frame rail and comprising a second elongated slot extending along a second length of the second side plate; and a handle assembly pivotally attached to the mounting brackets at a second pivot axis and pivotally and slidably attached to the first and second side plates of the first and second frame rails of the stair assembly, the handle assembly comprising a first hand rail having a first lower end and a first upper end and a first handle support frame connected to the first hand rail and a second hand rail having a second lower end and a second upper end and a second handle support frame connected to the second hand rail;

a first fastener coupling the first handle support frame to the first side plate, the first fastener at least partially disposed in the first elongated slot of the first side plate;

a second fastener coupling the second handle support frame to the second side plate, the second fastener at least partially disposed in the second elongated slot of the second side plate;

wherein, when the stair system moves between the stowed configuration and the deployed configuration, the first fastener is operable to travel along the first elongated slot of the first side plate of the first frame rail, the second fastener is operable to travel along the second elongated slot of the second side plate of the second frame rail, and both the stair assembly and the handle assembly are operable to rotate about the first fastener and the second fastener;

wherein, in the deployed configuration, the stair system extends outwardly and downwardly from the side rail of the cargo platform, and the first upper end of the first hand rail and the second upper end of the second hand rail each extend over the upper side of the cargo platform; and wherein, in the stowed configuration, the stair system does not occupy the cargo storage area and remains attached to the cargo platform.

19. The commercial vehicle of claim 18, wherein, in the deployed configuration, an uppermost step platform of the plurality of step platforms of the stair assembly is located vertically lower than the upper side of the cargo platform; and wherein, in the stowed configuration, the stair system is positioned beneath the cargo platform and extends generally parallel to the underside of the cargo platform.

* * * * *